Aug. 6, 1935.   H. HOLZWARTH   2,010,019
METHOD OF OPERATING EXPLOSION CHAMBERS
Filed July 5, 1929   7 Sheets-Sheet 1

Fig.1

Inventor:
H. Holzwarth
By: Marts & Clark Attys.

Low temperature destillation of browncoal from Westerwald - Germany

Aug. 6, 1935.  H. HOLZWARTH  2,010,019
METHOD OF OPERATING EXPLOSION CHAMBERS
Filed July 5, 1929  7 Sheets-Sheet 6

Inventor:
H. Holzwarth

Patented Aug. 6, 1935

2,010,019

UNITED STATES PATENT OFFICE 2,010,019

METHOD OF OPERATING EXPLOSION CHAMBERS

Hans Holzwarth, Dusseldorf, Germany, assignor to Holzwarth Gas Turbine Co., San Francisco, Calif., a corporation of Delaware Application July 5, 1929, Serial No. 376,135
In Germany July 12, 1928

5 Claims. (Cl. 60—41)

My invention relates to explosion chambers of the constant volume type, such as are employed in explosion turbines, and has for its primary object to provide an improved process for the operation of such chambers with difficultly ignitable fuel in a manner to insure the rapid and complete combustion of such fuel.

When difficultly ignitable fuel, such as coal dust, tars, and similar substances, is employed in explosion chambers, particularly of explosion turbines, there arise certain difficulties due to the peculiar nature of the explosion cycle, wherein only a very short period of time is available for ignition and combustion, which difficulties are not met in apparatus in which the combustion proceeds not explosively and periodically, but under constant pressure and continuously.

While only a single initial ignition is necessary to start a constant pressure combustion process in continuous operation, there being available any necessary time period for starting the combustion, in the case of explosion chambers the ignition must be repeated at every cycle and must be completed within a predetermined time interval. In constant pressure continuous combustion, as exemplified by burners and constant pressure gas turbines, it is entirely immaterial whether the initial ignition for starting the combustion occurs slowly or not, if only the combustion process proceeds stably and uninterruptedly once the combustion is begun, and such ignition has never caused the slightest difficulty. For example, coal dust burners for steam boilers are set into operation by means of an igniting gas or of injected liquid fuel, whereupon the burner can be maintained in uninterrupted operation without any difficulty.

However, with engines operating on the explosion cycle with difficultly ignitable fuel, the practicability of the process depends almost exclusively upon igniting the mixture of air and fuel within the short, predetermined time interval allotted therefor and upon obtaining a rapid and stable combustion. The initiation of the combustion and the securing of complete burning within a very short time is thus of the highest importance in explosion engines. In fact, once the stream of fuel has been ignited in a constant pressure combustion mechanism, the problem of ignition no longer exists, since the mixture to be burned is directed into an already formed hot flame which ignites such mixture without the slightest difficulty; in explosion engines this problem presents itself at every cycle, i. e. many times per minute.

To overcome the difficulties that have been experienced in operating explosion turbines with fuels that ignite with difficulty, particularly coal dust, it has already been proposed to introduce into the explosion chamber readily ignitable fuels simultaneously with the first-mentioned fuels. It has heretofore been assumed that in igniting the charge which is composed of the particles of the fuel which are difficult to ignite, the readily ignitable fuel, preferably a gas, and the oxygen or air necessary for the combustion of the charge, with an excess of oxygen or air if desired, the combustion of the readily ignitable mixture of auxiliary fuel and air at first produces a thin flame of such a high temperature that the conditions requisite for the ignition of the main part i. e. the difficultly ignitable portion of the charge arise. As a matter of fact, explosive combustions of the charge might be obtained in this manner. Careful investigations of the process of combustion have, however, shown that the combustion lines of diagrams taken at different positions in the explosion chamber differ in form, showing that the combustion proceeds slowly in at least a large part of the charge and is therefore incomplete and capable of improvement.

The object of the present invention is to eliminate this incompleteness in the combustion and to obtain a uniformly steep combustion line throughout the combustion chamber. The process suggested according to the present invention for solving this problem is characterized by the fact that from a fuel which is difficult to ignite, after the introduction of a charge containing it into the explosion chamber, the more inflammable, volatile constituents are split off and such expelled gases and vapors are given time to diffuse until they fill the interstices between the particles of the fuel. Such a process is fundamentally different from the process in which the ignition of the main, i. e. difficultly ignitable portion of the charge is produced by the action of a thin flame by feeding an auxiliary, readily ignitable fuel into the explosion chamber. In this latter process only a part of the heavy fuel particles, namely the part that has passed into the region of the admission current of the auxiliary readily ignitable fuel, is surrounded by such latter fuel and burns explosively with the mixture of auxiliary fuel and air, while the greater number of such particles remains completely devoid of an envelope of readily ignitable fuel, so that the ignition of the main portion of the charge can occur only by the thin flame action, that is to say, in a second, slower stage of the combustion. In addition to this there is the serious disadvantage that fuels which are difficult to ignite, such as tars, coal dust or the like, must not be conveyed into the explosion chamber as a compact mass, but must be finely atomized and distributed in the explosion chamber by means of the combustion air or of special high pressure atomizing air. This air becomes occluded at the surfaces of the fuel particles and envelopes them, so that it is not possible for the simultaneously introduced auxiliary fuel to reach the heavy fuel particles readily and to envelope them directly by displacing the envelopes of air. The result is that the constituents of the charge are non-uniformly distributed in the explosion chamber: there are present in the latter fuel particles that are difficult to ignite, other fuel particles with an atmosphere or envelope of air, other fuel particles with an atmosphere of air and a corona of gas, and still other particles with a corona of gas. The last-mentioned contents of the charge are recognized according to the present invention as being responsible for explosive combustion; they are, however, only to a slight, and inconsequential degree present in the combustion in the case of known charging processes for the reasons given. Only to the accidental formation thereof is the occurence of ignitions with such processes at all to be attributed. It is, however, desirable not merely that combustions be obtained, but that the combustions should be as complete as possible in order to enhance the economy of the process. By enveloping the fuel particles of a charge with more readily ignitable fuel in accordance with the invention, the conditions requisite for the uniform and rapid combustion of all the contents of the charge in the explosion chamber are provided. Owing to the fact that the enveloping of the fuel particles is carried almost or quite to the point of filling the interstices between the individual particles of the fuel that is difficult to ignite, the spontaneous explosive ignition of the charge is effected by the immediate propagation of the flames obtained. The enveloping of the fuel particles with the readily ignitable fuel and the filling of the interstices with the latter fuel are caused to take place to such an extent that a uniform combustion line is obtained irrespectively of the position in the explosion chamber at which the pressure-time diagram is taken.

The separation of the more inflammable components of a fuel from the more difficultly ignitable residue according to the invention may be carried out in two different ways, namely by chemical and by thermal means. Of course transitions from one process to the other are unavoidable, but also immaterial.

The thermal method, as being simpler, will undergo a further development according to the invention. It is based upon the known fact that liquid fuels of low inflammability, such as tars, mazout and distillation residues of complicated chemical structure, tend at definite temperatures, which are fixed points for the fuel in question, to form oil gas, and that coal, lignite and the like tend to form distillation gas. Oil gases and distillation gases have the property of igniting easily. My improved process is accordingly characterized by the fact that the temperature in the explosion chamber, for example, of an explosion turbine, is kept higher than the temperature at which the fuel particles introduced into the explosion chamber begin to split off gases that ignite easily. The requisite temperatures in the explosion chamber may be maintained by keeping the combustion gases in the explosion chamber, after the explosion, for so long a period that the walls of the chamber become heated sufficiently to liberate the ignitable gases of the subsequent charge. A combustion turbine of the constant volume type, for example, may be from the outset designed for operating with fuels that are difficult to ignite by adjusting the controlling members for the outlet or nozzle valve in such a way that the latter opens only after a definite time interval after the explosion, the combustion gases during this interval being substantially at the maximum explosion temperature and pressure, and therefore supplying to the chamber walls so much heat that the heat transmitted during the next cycle to the fuel particles of the new charge is sufficient to split off therefrom the readily ignitable constituents. A combustion chamber originally designed for operation according to known processes can, however, be very readily changed over to a method of working with fuel that is difficult to ignite in accordance with the invention merely by advancing the time of ignition.

My invention will now be more fully explained by reference to the accompanying drawings and diagrams which illustrate my invention in connection with an explosion turbine; in said drawings,—

Figure 1:
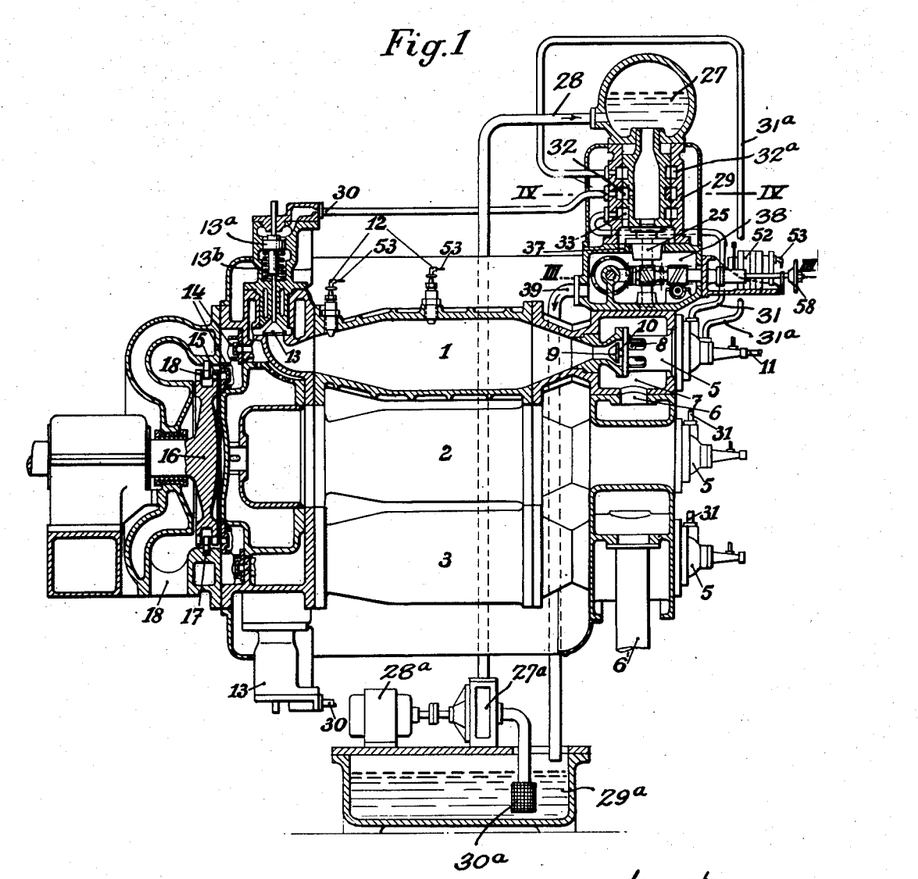
Figure 1 is a sectional elevation.
Figure 2:
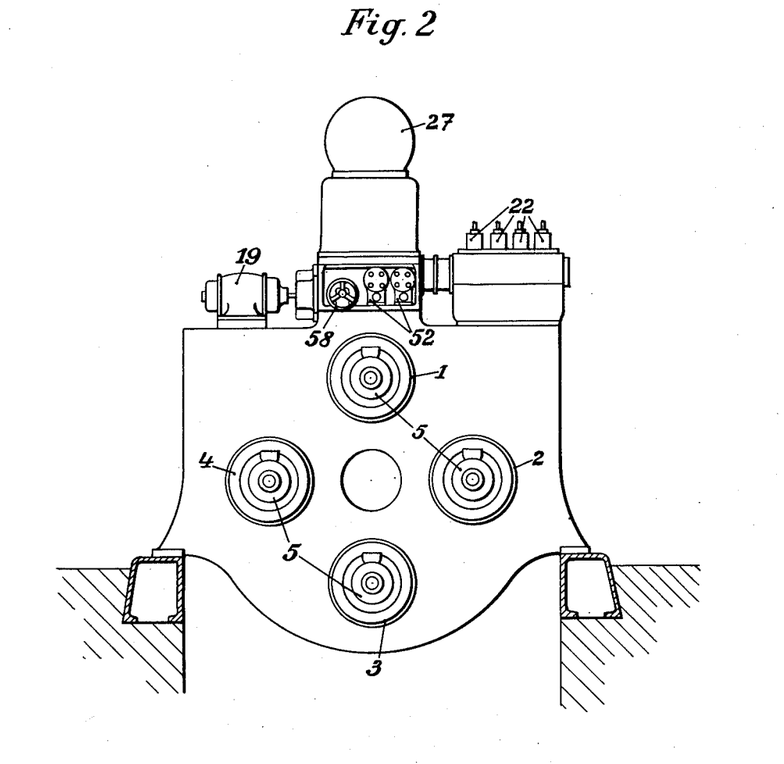
Figure 2 an end elevation of a combustion turbine of the constant volume type.
Figure 3:
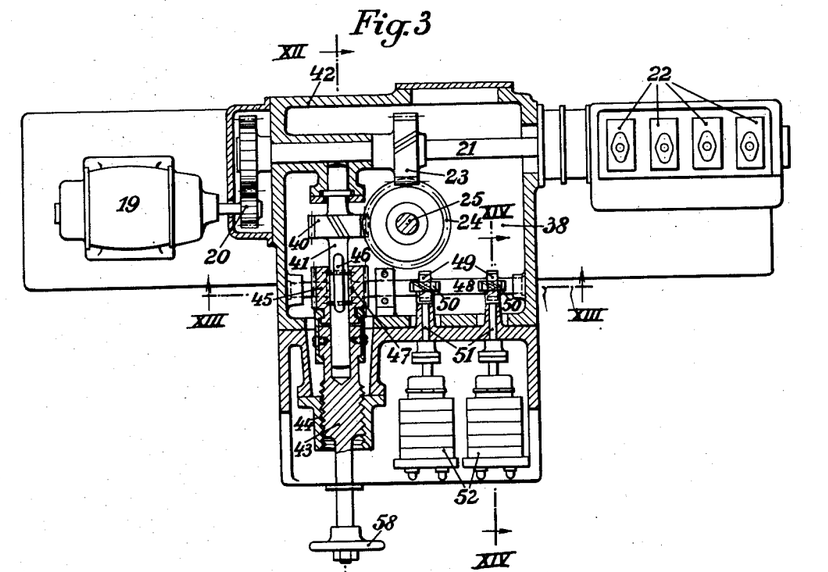
Fig. 3 is an enlarged horizontal section along the line III—III of Fig. 1.

In these drawings 1, 2, 3 and 4 denote four explosion chambers. Each explosion chamber is provided, at the side remote from the turbine rotor, with inlet members 5 for air and fuel. The air is supplied through a common pipe 6' to the valve chest 7, which surrounds the fuel and air admission devices 5, the air passing to the individual air inlet members through ports 6. From the valve chest 7 the air passes through gaps 8 in the valve barrel into the interior of the valve, and through the opened valve cone 9 into the interior of the combustion chamber. Concentrically in the valve spindle 10 of the air admission member is arranged the fuel admission member for liquid fuel. The liquid fuel is introduced through a pipe 11. If the combustion turbine is operated not with liquid but with pulverulent fuels, the pulverulent fuel is added to the charging air either inside the housing of valve 5 or before such air is introduced into the valve, the air entering through the pipe 6' and the valve chest 7, and the mixture thus formed is admitted into the interior of the explosion chamber through the opened valve cone 9. After the introduction of the mixture, the same is ignited by ignition means 12. After a predetermined time a hydraulically-controlled nozzle valve 13 is opened and allows the highly heated burnt gases to escape into the nozzle 14. Through the nozzle 14 the burnt gases, act upon the rotor blades 15 of the rotor 16, are deflected in the ring of guide blades 17, and are exhausted through an outlet 18' after acting upon the second ring of rotor blades 18 on the rotor 16, after which they may be utilized in any desired way; for example, as described in my U. S. Patent No. 1,829,749, issued Nov. 3, 1931.

The opening of the valve 13 is accomplished by causing the discharge of pressure oil which is controlled as described hereinbelow and which, by acting against the piston 13a of the valve, holds the latter closed, the discharge of the oil enabling the spring 13b together with the gas pressure acting upon the valve 13 to open such valve.

The admission members 5 and the nozzle valves 13 of this internal combustion turbine are hydraulically controlled in the following manner:—

Above the valve chest is arranged an electric motor 19, which, as illustrated in Figure 3, through gearing 20 and a counter-shaft 21, drives the fuel pumps 22 and, through helical gears 23 and 24, drives a vertical control shaft 25. The vertical control shaft 25 carries a distributor 26, the interior of which communicates with a pressure-liquid accumulator 27. To the accumulator 27 liquid under pressure is supplied through a pipe 28 from a pressure liquid pump 27a which is driven by an electromotor 28a and sucks the oil from an oil tank 29a through a strainer 30a. The distributor 26 revolves in a cylindrical casing, which has, at 30, 31, and 31a pipe connections uniformly distributed in a circle about its periphery. The pipe connections 30 lead to the corresponding pipe connections 30 of the hydraulically controlled nozzle valves 13. The distributing conduit 30 is shown only for the chamber 1. The pipe connections 31 communicate with corresponding pipe connections 31 of the admission members 5 for the air and for the mixture of air and fuel. The pipe 31a may be provided for actuating a valve for the injection of fuel, such valve being arranged inside the stem of the valve 9, as described below in connection with Fig. 10. The annular space between the distributor 26 and the cylinder casing 29 is divided as regards its height by rings rigidly secured to the distributor 26 so as to form annular controlling chambers 32a, 32 and 33.

Figure 4:
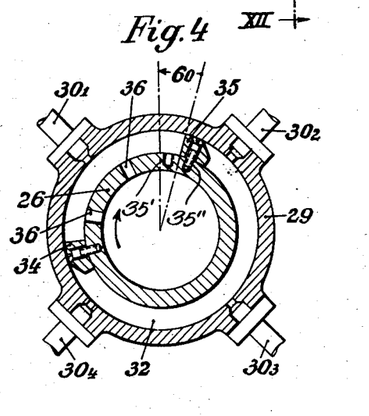
Fig. 4 shows a horizontal section through the distributor on the line IV—IV of Fig. 1.

As shown in Fig. 4, the controlling chamber 32 is divided into two chambers by partitions 34 and 35 connected rigidly with the distributor 26. The smaller of the two chambers, the pressure chamber, communicates by apertures 36 with the interior of the distributor 26 and therefore with the pressure liquid accumulator 27. The other chamber, which is relieved of pressure, communicates through an aperture 37 (Fig. 1) with the chamber 38, on which helical wheels 23 and 24 revolve. From this chamber the oil relieved of pressure is drawn off through a pipe 39 and conveyed to a pressure-liquid pump, not shown. What is shown in Figure 4 for the controlling chamber 32 also applies to the controlling chamber 33.

The distributor operates as follows:

If, as illustrated in Figure 4, the pressure chamber has been rotated to a position opposite the pipe connection 30₁, which leads to the nozzle valve 13₁ of the explosion chamber 1, this valve opens, and remains open until the partition 34 has passed beyond the aperture in the cylinder casing 29 which leads to the pipe connection 30₁, according to the direction of rotation of the distributor 26. At this moment the nozzle valve of the combustion chamber 1 closes, and opens again only when the abutment 35 again passes beyond the aperture, and thereby allows liquid under pressure to pass into the connecting pipe 30.

With the helical gear 24, which transmits the movement of the electric motor 19 to the vertical control shaft 25, there meshes a helical gear 40, which is mounted fast upon a shaft 41. The shaft 41 is at one end journalled in the casing 42, and at the other end in a sleeve 43. The sleeve 43 is supported in such a manner as to be longitudinally slidable by means of a screw thread 44 and a hand wheel 58. It transmits its motion to a helical gear 45, which also is arranged upon the shaft 41, and participates in the rotary motion thereof through the medium of a key 46. The helical gear 45 meshes with a helical gear 47 arranged underneath it, which is mounted fast on a shaft 48. The shaft 48 on the other hand is provided with two helical gears 49, which mesh with helical gears 50. The helical gears 50 are arranged upon shafts 51, which transmit their movement to ignition devices 52. The ignition currents furnished by the ignition devices 52 are supplied by cables 53 to igniters 12 in the explosion chamber.

Figure 6:
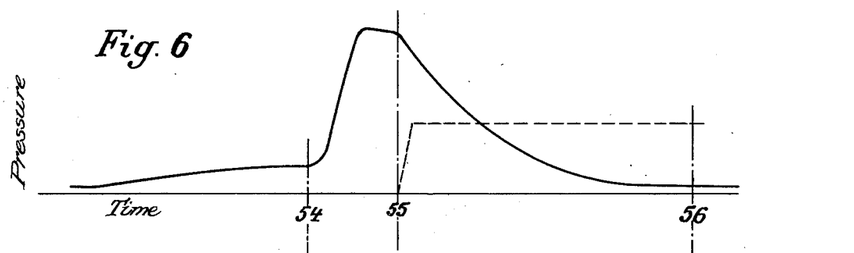
Fig. 6 is a time-pressure diagram of an explosion chamber operating according to known processes.

The normal pressure time diagram of such a combustion turbine of the constant volume type is shown in Figure 6, wherein the abscissæ represent time and the ordinates pressure. Its fundamental characteristic is given by the combustion line, which starts after the ignition at the point 54, by the expansion line, which starts at the point 55 after the opening of the nozzle valve, and by the charging line, which starts at the point 56 after the opening of the charging valve. The dotted line in Figure 6 denotes the valve lift curve of the nozzle valve 13. Through the opened nozzle valve the combustion gases expand beyond the points 55 and 56.

Now if a fuel that is difficult to ignite, such as lignite, is to be burnt, the investigation of this fuel shows that, at particular temperatures, it begins to split off readily ignitable gases or emanations.

Figure 9:
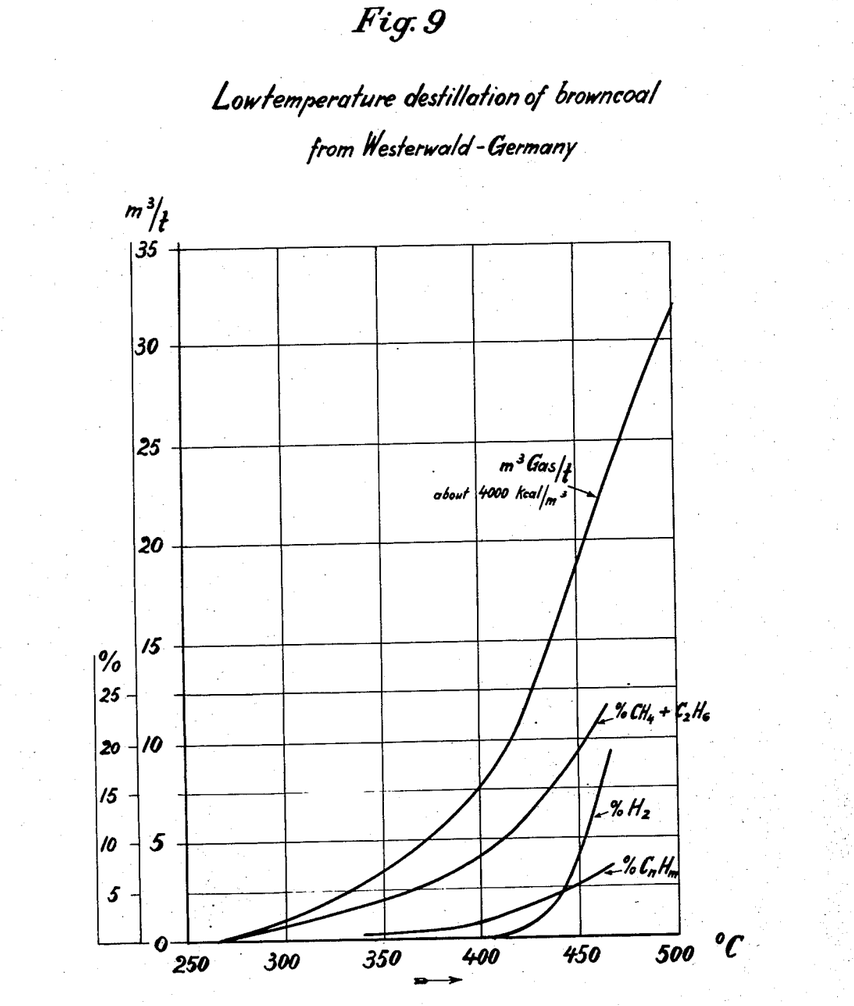
Fig. 9 is a diagram illustrating the rate of liberation of easily ignitable gases and vapors from a German brown coal.

Figure 9 shows by way of example the corresponding diagram for a lignite from the German Westerwald. It is found, that the emanation of the gases begins at 270° C., and at 430° for example 25% of the total gas content has already emanated. The next curve shows what percentage of $CH_4+C_2H_6$ is split off at 250°. At about 350°, separations of the heavy carburetted hydrogens of the composition $C_nH_m$ are noticeable, while finally at 400° the separation of the hydrogen commences. Now the invention is based upon the discovery that such fuels, which are difficult to ignite, begin to split off readily ignitable fuel at particular temperatures, and that these readily ignitable fuels can be made the supporter of the combustion, if care is taken that the fuel that is difficult to ignite comes to this temperature, and that lignite dust for instance of the type characterized in Figure 9 is brought to at least 270°. If for instance a combustion turbine which has previously been driven with readily igniting fuels according to diagram 6, for instance with benzene or with coal gas, is to be changed over to burning lignite dust, the chamber walls must be so heated that by giving up heat to the fresh charge of lignite dust they heat the latter up to at least 270° before ignition. This is attained by increasing the length of time during which the combustion gases are maintained at or near the maximum burning gas pressure in the combustion chamber. For this purpose according to the time-pressure diagram of Figure 7, the moment of ignition 54 is advanced by the amount 57 relatively to the moment 54 in Figure 6. The time during which the combustion gases are kept at the maximum pressure in the combustion chamber is accordingly increased, this being expressed in the diagram of Figure 7 by a broadened saddle. The nozzle valve however still opens at the point 55. The advancement of ignition is effected by rotating the hand wheel 58. When the hand wheel 58 is rotated, the sleeve 43, in consequence of its screw threaded guide 44, receives a longitudinal displacement in relation to the casing 42, and this displacement is transmitted to the helical gear 45. The helical gear 45, in consequence of the arrangement of the key 46, is immovable angularly relatively to the shaft 41, so that under the influence of the inclined planes of the helical teeth rolling upon one another this helical gear 47 rotates relatively to the helical toothed gear 45. As the shafts 51 are connected to the gear 47 through the shaft 48 and the pairs of helical gears 49 and 50, they participate in this rotation, and the armatures of the ignition devices accordingly also participate therein. Hence the ignition times are shifted relatively to the ignition times which were adjusted before the rotating of the hand wheel 58, so that by rotating the hand wheel 58 in a suitable direction the ignition is advanced by the amount 57.

Figure 5:
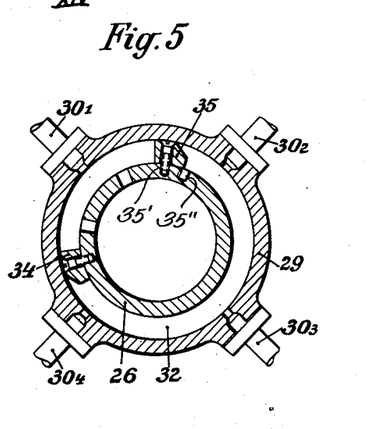
Fig. 5 is a horizontal section through a distributor originally designed for operation with an explosion chamber employing difficultly ignitable fuel.
Figure 8:
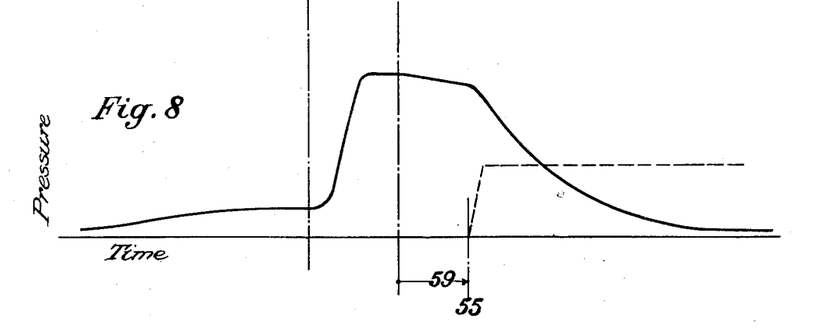
Fig. 8 is a similar diagram of an explosion chamber operating according to a different embodiment of the invention, the opening of the nozzle valve being retarded as compared with prior practice.

If on the contrary the combustion turbine is not to be changed over, after operation with an easily ignitable fuel, to a fuel that is difficult to ignite, but is to be designed from the outset for the combustion of a fuel that is difficult to ignite, the nozzle valve gear is so adjusted that the length of time during which the combustion gases in the explosion chamber are kept at or approximately the maximum pressures, and therefore at the maximum temperature, becomes longer. The time pressure diagram according to Figure 8 shows the result. The nozzle valve no longer opens at the point 55 of the diagram in Figure 6 but at the point 55 in the diagram of Figure 8, so that the nozzle valve, as compared with Figure 6, closes later by the interval 59. The nozzle valve lift curve shown in dotted lines is accordingly displaced towards the right. The constant pressure saddle in the diagram is again enlarged so that the highly heated combustion gases transmit their heat for a longer time to the walls of the combustion chambers, and therefore heat the latter to a correspondingly higher temperature. The more highly heated walls transmit more heat during the next cycle to the freshly injected fuel which is difficult to ignite so that the latter assumes the temperatures at which the separation of the readily igniting constituents starts. The readily igniting constituents then become supporters of the combustion when ignition commences. The later opening of the nozzle valve gear is obtained by arranging the partition 35 of the distributor 26, not as shown in Figure 4, which corresponds to an arrangement for operating with readily igniting fuels, but in the manner shown in Figure 5. This may be accomplished by providing a plurality of threaded bores 35', 35'' in the distributor 26 and anchoring the mounting screw of the partition in one or another of such bores, as illustrated in Figs. 4 and 5. Considered in relation to the revolving distributor body 26, the partition 35, according to Figure 5, connects the pipe $30_1$ with the pressure liquid later by the angular amount 60. To the angular distance 60 in Figure 4 there corresponds the interval of time 59 in Figure 8. In this way the result is obtained that the interval of time between ignition and the opening of the nozzle valve, and therefore the constant pressure saddle in the diagram, become greater, so that a combustion turbine with a distributor control according to Figure 5, is suitable from the outset for operating with fuels that are difficult to ignite. An essential feature of the invention is that numerous modifications can be made without affecting the essence of the invention.

Figure 7:
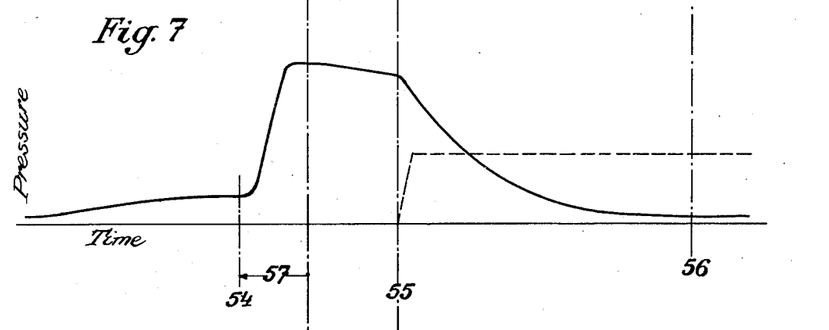
Fig. 7 is a similar diagram of an explosion chamber operating in accordance with the invention, the moment of ignition being advanced as compared with prior processes to increase the time interval during which the explosion gases remain in the chamber.

As will be seen from a comparison of Fig. 7 or 8 with Fig. 6, in my improved mode of operation the saddle, i.e. the time interval elapsing between the instant that the maximum explosion pressure is attained and the instant at which the nozzle valve is opened, is a multiple of that obtained in the methods of operation heretofore employed. The saddle in Fig. 6 involves an interval of 1/100 to 2/100 sec. occurring in gas and light oil operation.

Figure 10:
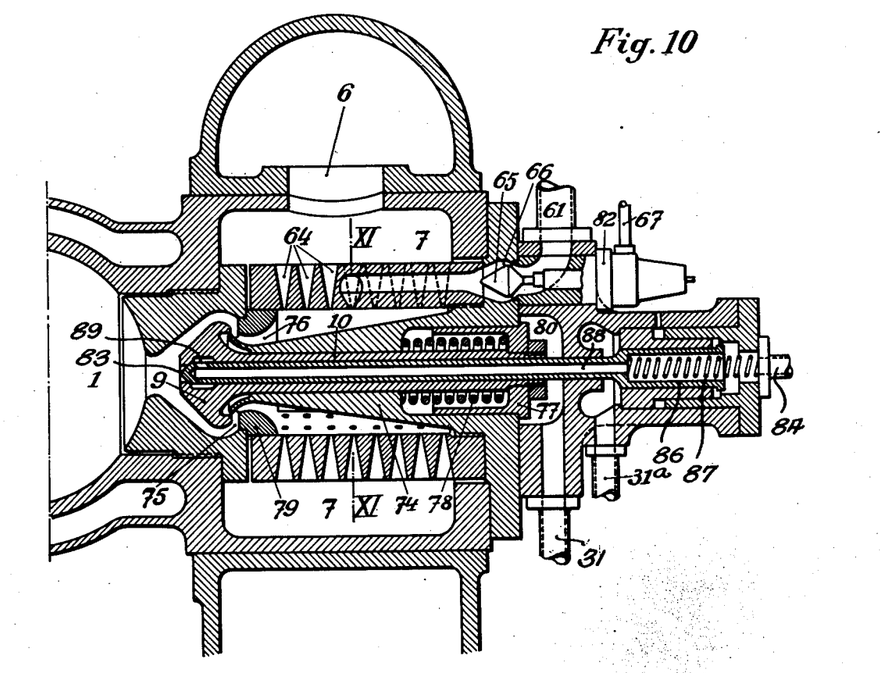
Fig. 10 is a longitudinal section through the inlet valve of an explosion chamber.
Figure 11:
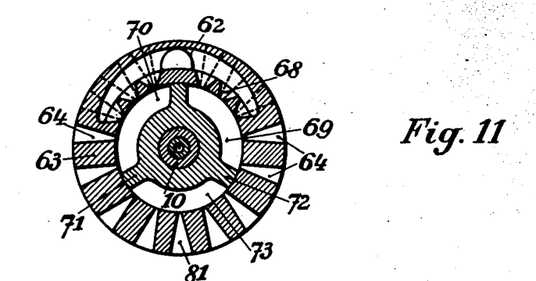
Fig. 11 is a transverse section through such valve along the line XI—XI of Fig. 10.
Figure 12:
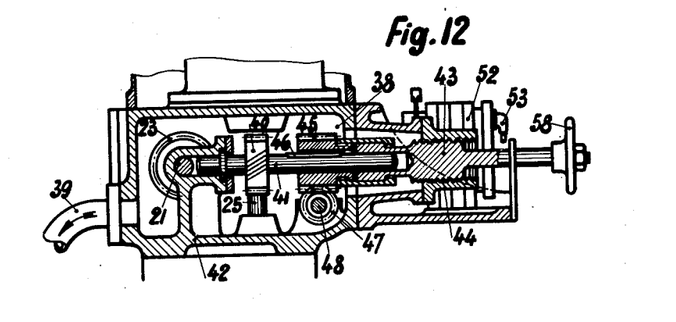
Figs. 12, 13 and 14 are sections taken along the lines XII—XII, XIII—XIII, and XIV—XIV, respectively, of Fig. 3.
Figure 13:
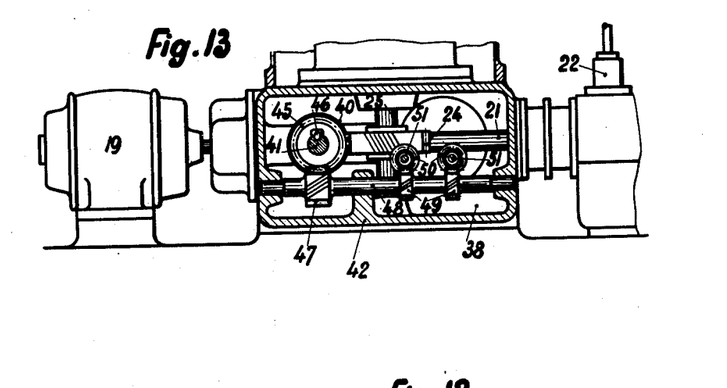
Figure 14:
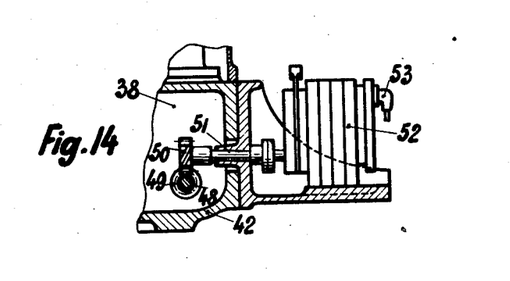

Figures 10 and 11 show a valve which may be employed when the pulverulent fuel is to be added to the charging air before entering the admission member, as disclosed in my United States Patent No. 1,897,478. 1 denotes the combustion chamber, which is to be rhythmically charged with coal dust by the admission member 9. A rich mixture of coal dust and air is first formed, in a manner known in itself and as disclosed in my United States Patent No. 1,810,768, and then supplied to the distributor chamber 62 of the explosion turbine by means of a pipe 61 which leads to a fixed safety device 63 surrounding the admission member 9 like a basket. Before the mixture passes into the chamber 62 inside the fixed non-return safety device 63, which is formed of dampening nozzles 64 tapering in the direction of flow as described in my United States Patent No. 1,862,154, it flows over the closure cone 65 of a movable non-return safety valve 82. The valve head or cone 65 is preferably maintained open by external means, such as a spring, as described in my last-mentioned patent, so that the result is obtained that by the mixture of coal dust and air itself no force need be exerted for opening the same; this is advantageous because I have found that the exerting of pressure on the valve by the flowing material always leads to irregularities in the conditions of flow of the mixture of coal dust and air, which may give rise to a separation and accumulation of coal dust, or even to clogging of the passageway about the valve head 65. As, however, the arrangement of the closure member 65 causes a reduction, though only a slight one, of the path of flow, according to a further development of the invention a current of air flows constantly through a pipe 67 and the annular space 66 about the closure member 65, so that the latter is ventilated, the cross section 66 is scavenged and at the same time an ejector action is produced which favourably influences the delivery of the mixture of coal dust and air over the cross section 66. After the mixture has in this manner passed into the distributing chamber 62 of the fixed non-return safety device 63, 63 it is conveyed out of the latter through passages 68 resembling dampening or brake nozzles into the chambers 69 and 70, which are located between the admission member and the non-return safety device 63, 63. As Figure 10 shows, the main combustion air passes into these chambers 69 and 70, through brake nozzles 64, which are provided with air from the chamber 7 surrounding them through connecting port 6 and air supply pipe 6'. Through the chamber 73 between the admission member and the basket like non-return safety device 63, 63, which chamber is divided from the chambers 69 and 70 by ribs 71 and 72 of a guide 74 for the valve spindle 10 of the valve cone 9 of the admission member, such ribs terminating a short distance in front of the valve head 9, which exposes the admission cross section 75, there is added to the mixture which is diluted in the chambers 69 and 70 and which passes into the chamber 76, concentrically with the axis of the admission member, that air which is necessary for producing the mixture of definite composition which is to be introduced into the combustion chamber 1. It passes out of the chamber 7 through the passages 81 resembling brake nozzles and through the chamber 73 into the last mixing chamber 76. It will be understood that the brake nozzles 64, 68 and 81, while they permit the normal flow of air and fuel into the explosion chamber, will dampen or check a reverse flow of high pressure gases produced, for example, by premature ignition in the chamber 1 while valve 9 is open.

The valve head 9 is controlled through the valve spindle 10 by means of the piston 77 rigidly connected with the latter. A spring 78 holds the valve head 9 pressed against its valve seat 79 until controlling oil under pressure passes through the pressure pipe 31 into the pressure chamber 80. At this moment the admission member opens and allows air or mixture to escape into the explosion chamber 1. Fig. 10 shows the valve in the open position, a shoulder at the right-hand end of the piston 77 being arranged to engage the rear wall of the guide 74 to limit the opening movement of the valve.

To facilitate the initiation of the ignition, the valve 83 arranged within the stem of valve 9 may be actuated to inject the fuel supplied by the conduit 84, shortly before or simultaneously with the beginning of the introduction of the coal dust and air mixture. This may be accomplished by conducting pressure oil through pipe 31a to the space below the piston 86 which then opens the valve 83 against the resistance of spring 87. The fuel then enters through the inner bore 88 of the valve 83 and is expelled through the small bore 89 into the path of the charging air.

What I claim is:—

1. In combination, a pistonless, constant volume explosion chamber having a controllable air inlet valve and a controllable outlet valve; controllable means for charging a difficultly ignitable fuel into the chamber; igniting mechanism for igniting an explosive charge in said chamber; means for operating said igniting mechanism after the introduction of fuel has ceased and at substantially the instant when enough highly inflammable gases and vapors have been distilled from the fuel by heat radiated and conducted from the walls of the explosion chamber to envelop at least a large part of the fuel particles; and means operative to open said outlet valve after the ignition and combustion of the charge, said last-mentioned means constructed and timed to open said valve at a moment when the walls of the explosion chamber have become sufficiently heated by the explosion gases at explosion temperature and pressure to cause profuse distillation of highly inflammable gases and vapors from the charge of difficultly ignitable fuel admitted during the next cycle, so that the particles of difficultly ignitable fuel become surrounded by an envelope of easily ignitable fuel and burn explosively upon ignition.

2. In combination, a pistonless, constant volume explosion chamber having a controllable air inlet valve and a controllable outlet valve; controllable means for charging a difficultly ignitable fuel into the chamber; igniting mechanism for igniting an explosive charge in said chamber; means for operating said igniting mechanism after the introduction of fuel has ceased and at substantially the instant when enough highly inflammable gases and vapors have been distilled from the fuel by heat radiated and conducted from the walls of the explosion chamber to envelop at least a large part of the fuel particles; and means operative to open said outlet valve, after the ignition and combustion of the charge, said igniting mechanism operating means and said valve operating means being relatively so adjusted that a sufficiently long time interval between the moment of ignition and the opening of the outlet valve is provided for the gases to heat the chamber walls to so high a degree that upon the introduction of the next charge of difficultly ignitable fuel, so much highly inflammable gases and vapors are distilled therefrom that substantially every particle thereof becomes surrounded by an envelope of such highly inflammable gases and vapors, whereupon said difficultly ignitable fuel burns explosively upon ignition.

3. The improvement in the art of operating an explosion chamber of the constant volume type wherein a combustible charge of air and fuel is ignited while the inlet and outlet of the chamber are closed and wherein the combustion gases are discharged from the chamber at substantially maximum explosion temperature and pressure, comprising introducing a charge of air and difficultly ignitable fuel into the chamber, closing the chamber and igniting the combustible mixture in such chamber at the instant defined hereinbelow to effect explosion of said mixture, heating the walls of the chamber with the exploded gases by keeping the combustion gases in the chamber at maximum explosion temperature and pressure for so long a time interval that the temperature of the explosion chamber walls is raised to such an extent that the rapid distillation of easily ignitable gases and vapors from the charge of difficultly ignitable fuel introduced at the next cycle is promoted, but not so high as to cause pre-ignition of the fuel, then rapidly discharging the explosion gases from the chamber and introducing a new charge of air and difficultly ignitable fuel into the chamber, closing said chamber, and when sufficient easily ignitable gases and vapors have been distilled from such fuel to envelop at least a considerable portion of the particles of such fuel, igniting the mixture in the chamber, whereupon the distilled gases and vapors ignite and effect rapid combustion of the remainder of the fuel.

4. The improvement in the art of operating an explosion chamber of the constant volume type wherein periodic combustible charges of air and fuel are successively ignited while the inlet and outlet of the chamber are closed and wherein the combustion gases are discharged from the chamber at substantially maximum explosion temperature and pressure, comprising heating the explosion chamber walls sufficiently to maintain the temperature of such walls at such a high level that rapid distillation of easily ignitable vapors and gases from difficultly ignitable fuel introduced into the chamber takes place, but not so high as to cause pre-ignition of the fuel, charging air and such difficultly ignitable fuel into the chamber, closing the chamber, and, when sufficient easily ignitable gases and vapors have been distilled from such fuel, to envelop at least a considerable portion of the particles of such fuel, igniting the mixture in the chamber, whereupon the distilled gases and vapors ignite and effect rapid combustion of the remainder of the fuel.

5. The improvement set forth in claim 4, wherein the temperature of the explosion chamber walls is maintained so high that the fuel and air charge reaches a temperature above 300° C. before ignition, but not so high as to effect ignition of the charge.

HANS HOLZWARTH.